United States Patent
Von Tersch

(10) Patent No.: US 7,954,829 B2
(45) Date of Patent: Jun. 7, 2011

(54) RETRACTABLE WHEEL ASSEMBLY FOR A JACKSTAND

(76) Inventor: Ramon J. Von Tersch, Phoenix, AZ (US)

( * ) Notice: Subject to any disclaimer, the term of this patent is extended or adjusted under 35 U.S.C. 154(b) by 302 days.

(21) Appl. No.: 12/422,829

(22) Filed: Apr. 13, 2009

(65) Prior Publication Data
US 2010/0259020 A1    Oct. 14, 2010

(51) Int. Cl.
*B60S 9/00* (2006.01)
*B62D 61/12* (2006.01)

(52) U.S. Cl. .... 280/43.24; 280/475; 280/43; 280/43.17; 280/767; 280/763.1; 254/420

(58) Field of Classification Search .............. 280/475, 280/43, 46, 43.1, 43.11, 43.14, 43.17, 43.18, 280/43.24, 43.22, 767, 763.1, 764.1; 254/419, 254/420, 421, 422

See application file for complete search history.

(56) References Cited

U.S. PATENT DOCUMENTS

| | | | | |
|---|---|---|---|---|
| 1,063,620 A | * | 6/1913 | Thornley | 482/25 |
| 2,478,995 A | * | 8/1949 | Woodman | 248/503 |
| 2,675,246 A | * | 4/1954 | Arones | 280/43.17 |
| 2,718,657 A | * | 9/1955 | Ford | 16/34 |
| 2,812,951 A | * | 11/1957 | Hanson | 280/46 |
| 4,045,041 A | * | 8/1977 | Risser et al. | 280/43.17 |
| 4,417,738 A | * | 11/1983 | Kendall | 280/43.17 |

OTHER PUBLICATIONS

WWW.SCAFFOLDING.COM: Scaffolding Towers, pp. 1-2, Jul. 20, 2009.

* cited by examiner

*Primary Examiner* — Ruth Ilan
(74) *Attorney, Agent, or Firm* — The von Hellens Law Firm, Ltd.

(57) ABSTRACT

A receiver extends from the top of a retractable wheel assembly to receive the lower end of a jackstand or the like. Upon exerting pressure on a foot operated plate, a wheel is extended from the bottom of a plate and locked in place with a catch to permit transport of a trailer or the like attached to the jackstand. Upon release of the catch, the wheel will retract to bring the plate into contact with the ground and immobilize the trailer.

19 Claims, 4 Drawing Sheets

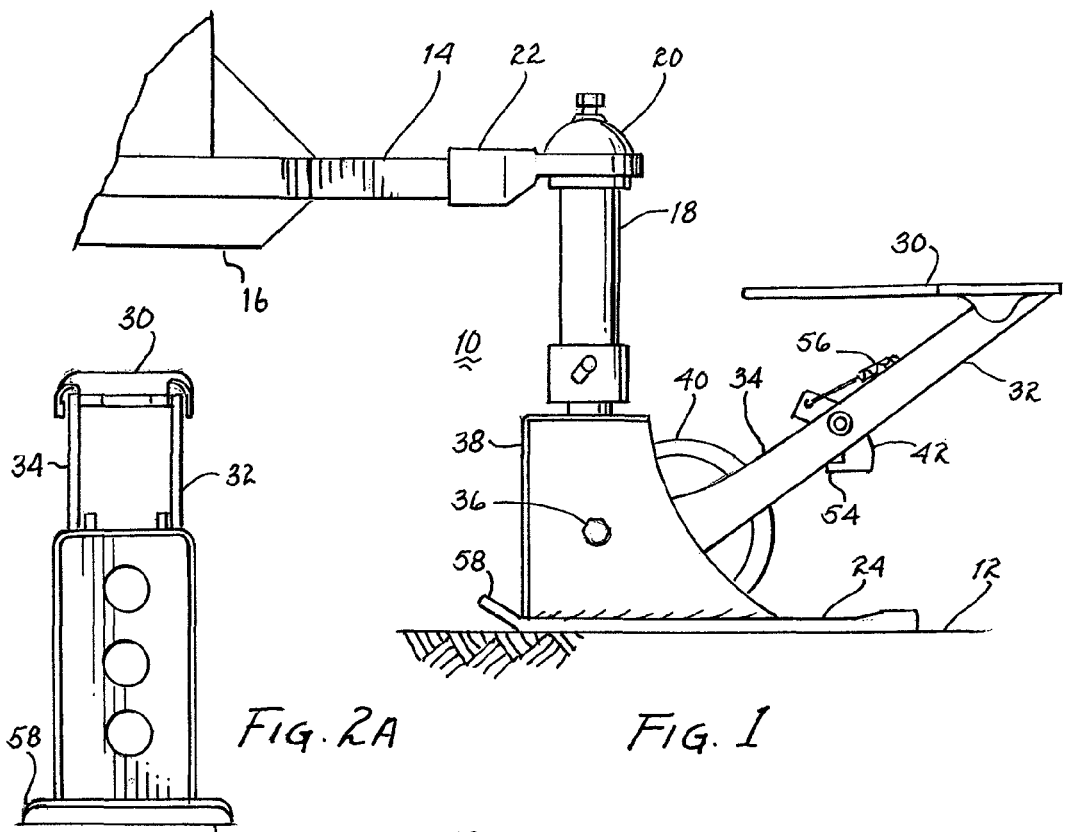
FIG. 2A
FIG. 1
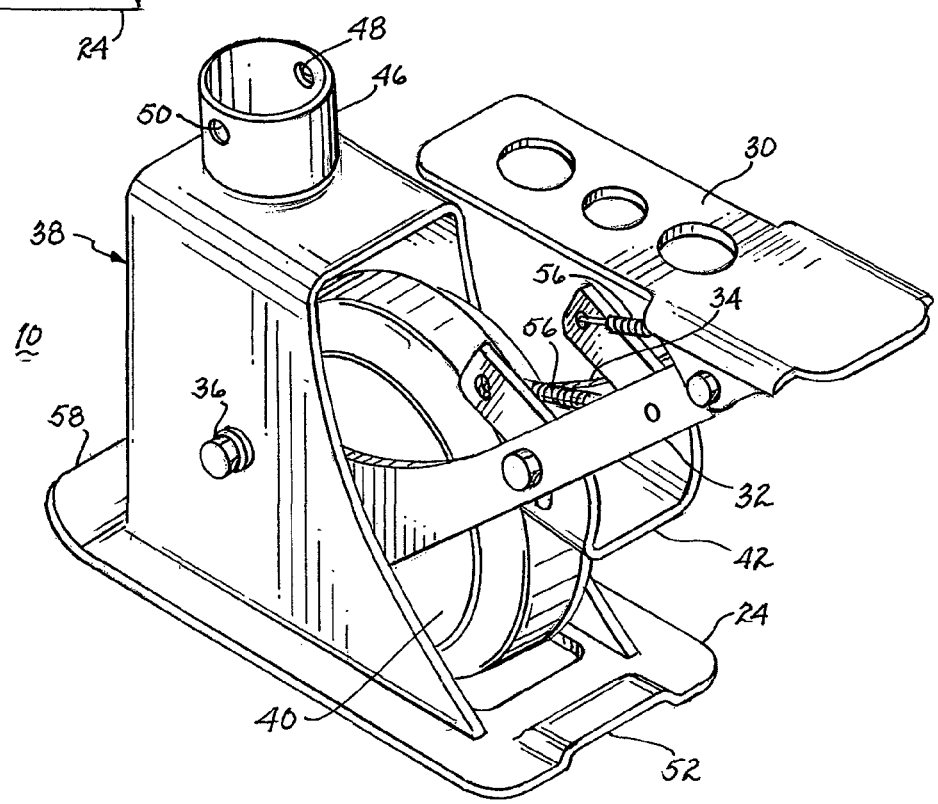
FIG. 2

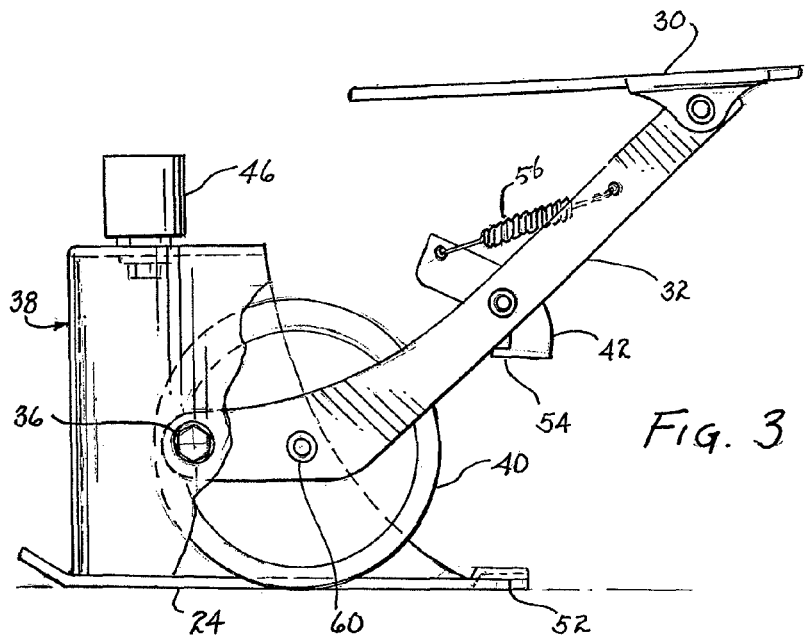
FIG. 3
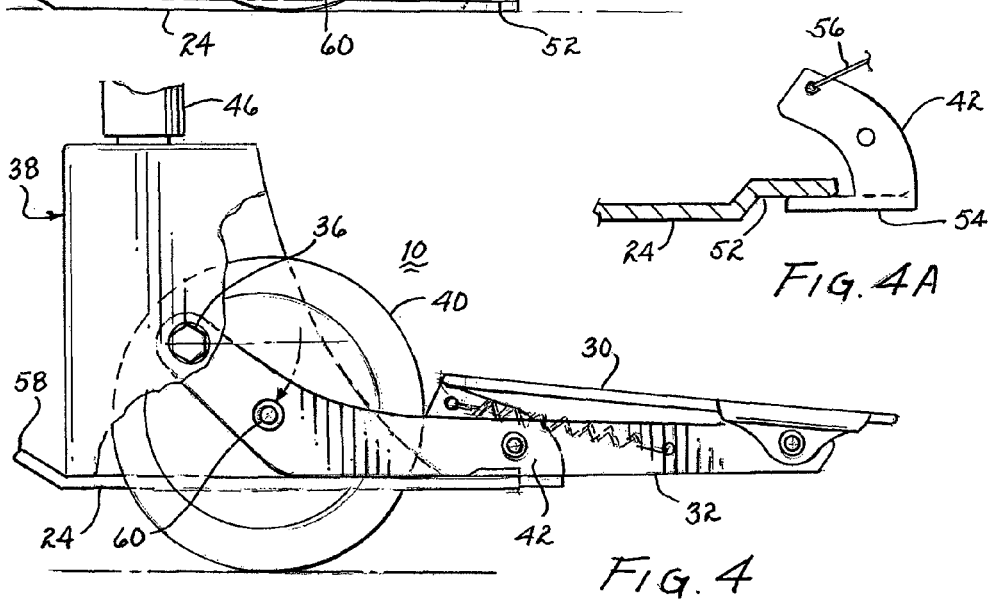
FIG. 4A
FIG. 4
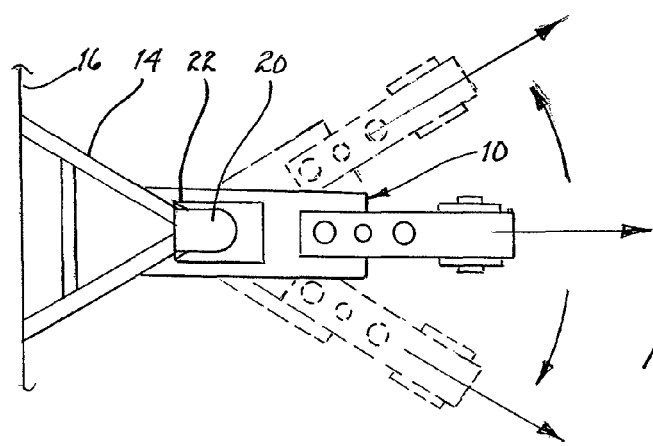
FIG. 5

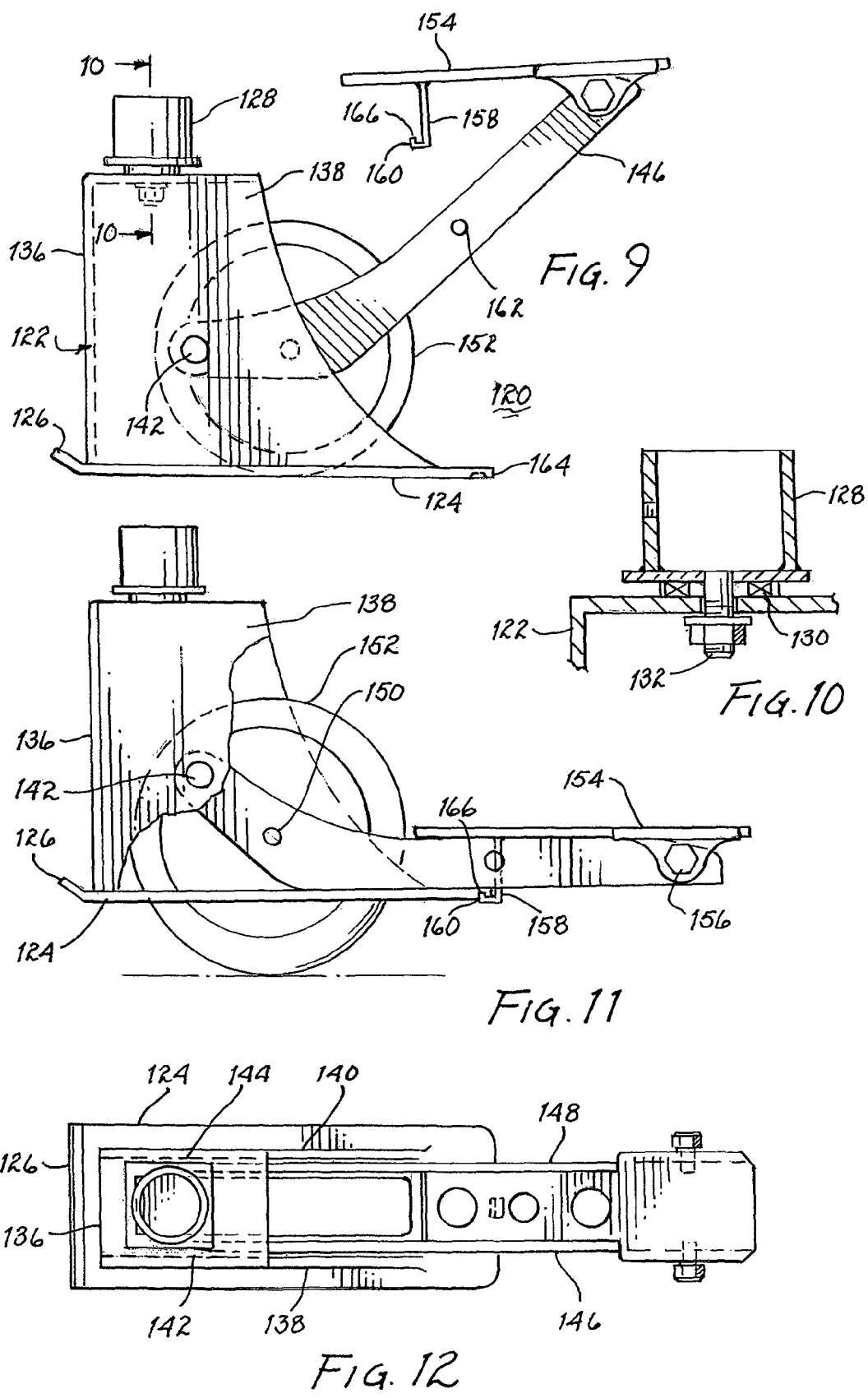

RETRACTABLE WHEEL ASSEMBLY FOR A JACKSTAND

BACKGROUND OF THE INVENTION

1. Field of the Invention

The present invention relates to a retractable wheel assembly for engagement with a trailer jackstand or the like to selectively permit transporting the trailer or immobilizing the trailer.

2. Description of Related Prior Art

Relatively light weight trailers usually have an extendable jackstand attached to the tongue, which jackstand includes a wheel to permit manual movement of the trailer. Heavier and/or larger trailers generally include a jackstand mounted on the tongue that has simply the end of a tube or a plate attached to the end of the tube for engagement with the ground. Such trailers are not manually moveable as the end of the jackstand or plate will not readily traverse the ground.

In order to hook up a trailer to a draft vehicle, the trailer may be manually moved into position if the jackstand includes a wheel. If there is no wheel, the draft vehicle must be maneuvered into a position to permit engagement of a latching mechanism at the end of the tongue with a ball attached to the draft vehicle. This is often a difficult and time consuming task, depending upon the skill of the driver.

Scaffolding often includes wheels mounted at the bottoms of the uprights to permit transport across the ground into position adjacent a building or the like. Generally, these wheels have mechanical friction locks to prevent unwanted movement of the scaffolding across the ground. However, depending upon the sophistication of the structure of the wheel supporting elements, rotational movement of the wheels about a vertical axis may occur. Sometimes the brakes are less than completely effective. Either of these problems create a safety hazard for personnel on the scaffolding.

Numerous other structures/apparatus require movement across the ground and a locking mechanism that can maintain the structure stationary on the ground. Furthermore, the transition from a stationary configuration to a mobile configuration must be relatively easy to accomplish and yet be essentially fail safe. To date, various apparatus exists for accomplishing these purposes but most suffer from various functional or structural impediments.

SUMMARY OF THE INVENTION

A retractable wheel assembly includes a housing for supporting an element to permit both moving and anchoring the element. A foot pedal operating a pair of arms pivotally attached to the housing lowers and raises a wheel to raise and lower, respectively, the housing to accommodate moving and anchoring the element. A catch, which may be released by pivotal movement of the foot pedal, retains the pair of arms in the lowered position and extension of the wheel.

It is therefore, a primary object of the present invention to provide a retractable wheel assembly for an attached element to selectively provide mobility to the element.

Another object of the present invention is to provide a retractable wheel assembly for an element that is foot operated to raise and lower the wheel.

Still another object of the present invention is to provide a retractable wheel assembly capable of supporting a significant load in either a stationary or a mobile configuration.

Yet another object of the present invention is to provide a retractable wheel assembly configurable for attachment to any structure for temporary mobility of the structure and immovably retaining the structure in place between periodic movements.

A further object of the present invention is to provide a retractable wheel assembly for anchoring an element in place and which is readily configurable to permit movement of the element.

A still further object of the present invention is to provide a method for selectively moving or anchoring an element in place.

A yet further object of the present invention is to provide a method for detachably attaching a retractable wheel assembly to an element to permit either moving the element or anchoring the element.

These and other objects of the present invention will become apparent to those skilled in the art as the description proceeds.

BRIEF DESCRIPTION OF THE DRAWINGS

The present invention will be described with greater specificity and clarity with reference to the following drawings, in which:

FIG. 1 is a side view of a retractable wheel assembly attached to the end of a tongue for a trailer;

FIG. 2 is a three-quarter isometric view of the retractable wheel assembly;

FIG. 2A is an end view of the retractable wheel assembly;

FIG. 3 is a partial broken side view illustrating the components of the retractable wheel assembly in its stationary configuration;

FIG. 4 is a partial broken side view of the rotatable wheel assembly in its mobile configuration;

FIG. 4A is a partial view illustrating a catch for maintaining the rotatable wheel assembly in its mobile configuration;

FIG. 5 illustrates angular movement of the rotatable wheel assembly to facilitate movement across the ground of an attached trailer;

FIG. 9 illustrates a side view of a yet further variant of the rotatable wheel assembly illustrating it in the stationary configuration;

FIG. 10 is a partial cross-sectional view taken along the lines 10-10, as shown in FIG. 9;

FIG. 11 is a side view of the further variant rotatable wheel assembly illustrating it in the mobile configuration; and FIG. 12 is a top view of the further variant rotatable wheel assembly.

DESCRIPTION OF THE PREFERRED EMBODIMENT

Figure 6:
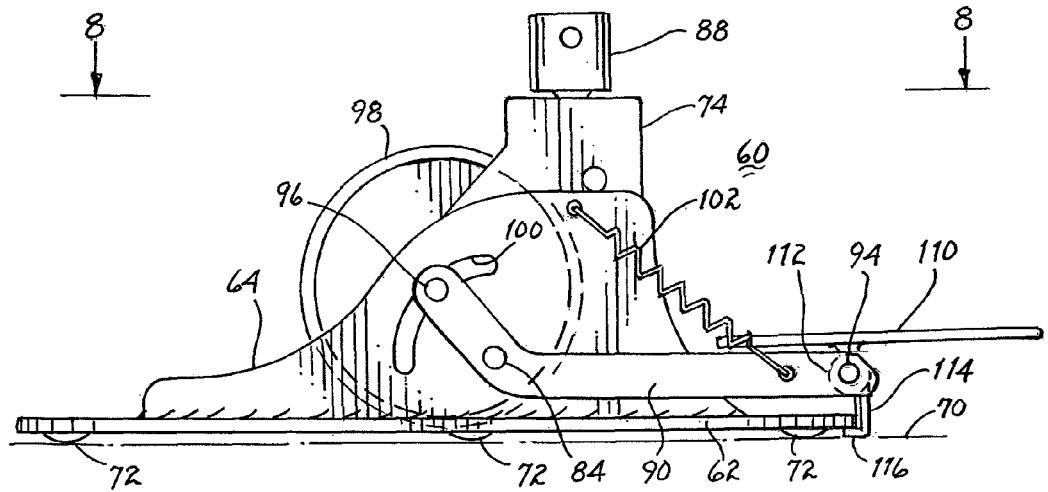
FIG. 6 is a side view of a variant retractable wheel assembly shown in the stationary configuration.

Referring to FIG. 1, there is shown a retractable wheel assembly 10 positioned on ground 12 and supporting a tongue 14 of a trailer 16. As illustrated, a shaft 18 extends into and is captured by cup 20 of hitch 22 at the front of tongue 14. As plate 24 rests upon ground 12, it serves in the manner of an anchor to prevent movement of tongue 14. A foot plate 30 is supported upon a pair of arms 32, 34, which pair of arms are rotatable about the axis of shaft 36 mounted within housing 38. The pair of arms rotatably support wheel 40. A pivotally mounted catch 42 is mounted intermediate arms 32, 34 for selective engagement with plate 24.

Referring jointly to FIGS. 2, 2A and 3, further details attendant retractable wheel assembly 10 will be described. Retractable wheel assembly 10 may include a cup or cylinder 46 for receiving shaft 18 or other support member. To lock such a support member within cylinder 46, a pair of diametrically opposed holes 48, 50 may be incorporated to receive a pin or the like extending through these holes and through the member to be attached. Plate 24 may include a recess 52 for receiving lip 54 (see FIG. 1) of catch 42. To retain the lip within the recess, one or more springs 56 maybe incorporated to urge lip 54 into engagement with recess 52. The opposite end of plate 24 may included and upturned section 58 to enhance movement of the retractable wheel assembly across the ground. FIG. 3 particularly illustrates shaft 60 in engagement with arms 32, 34 for rotatably supporting wheel 40 between these arms.

Referring jointly to FIGS. 3, 4 and 4A, the operation of retractable wheel assembly 10 will be described. Once the retractable wheel assembly is in place and in engagement with the element to be moved, an operator places his/her foot upon foot plate 30. The force exerted on the foot plate will cause a pair of arms 34, 34 to pivot downwardly about shaft 36. As wheel 40 is essentially resting on the ground, as shown in FIG. 3, housing about 38 will be raised as a function of the angular movement of the pair of arms about shaft 36. When pair of arms 32, 34 are at their lowest most position adjacent plate 34, as shown in FIG. 4, the wheel will be in its fully extended position and plate 24 will have been raised off the ground. Simultaneously, lip 54 of catch 42 will be brought into engagement with recess 52 defined by plate 24. To ensure engagement by lip 54 with recess 52, the edges of the plate defining recess 52 along with the edge of lip 54 maybe beveled to urge counter-clockwise rotation of the catch until the lip comes into engagement with the recess. Thereafter, springs 56 will urge clockwise rotation of the catch to retain lip 54 within recess 52. In this configuration of catch 42, wheel 40 will remain in the extended position shown in FIG. 4.

Once the retractable wheel assembly is in position, it can be anchored to the ground in the following manner. Upon release of catch 42 to disengage lip 54 from recess 52, the weight exerted by housing 38 and any attached element will exert a downward force upon shaft 36. This downward force will be translated into angular upward movement of pair of arms 32, 34 causing shaft 60 to be raised and wheel 40 will become retracted. To prevent an abrupt downward movement of housing 38 and an attached element, a yielding force can be exerted upon foot plate 30 by an operator to promote a relatively slow rise of the pair of arms.

As illustrated in FIG. 5, if retractable wheel assembly 10 is used to support a cup 20 of a hitch 22, the retractable wheel assembly can pivot about a vertical axis extending through cup 20. Thereby, an attached trailer 16, or the like, can be moved forwardly or rearwardly along a curved path as a function of the degree of angular displacement of the retractable wheel assembly relative to tongue 14.

Figure 7:
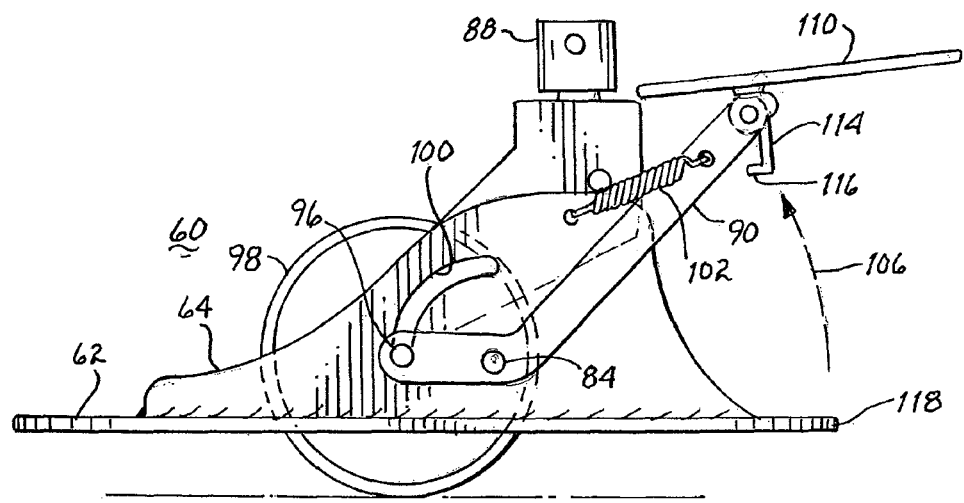
FIG. 7 is a side view of the variant retractable wheel assembly shown in the mobile configuration.
Figure 8:
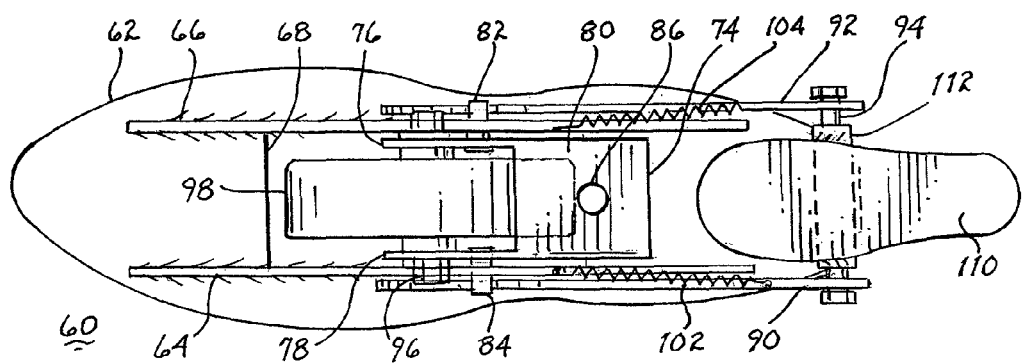
FIG. 8 is a top view taken along the lines 8-8, as shown in FIG. 6.

Referring jointly to FIGS. 6, 7 and 8, a first variant 60 of the retractable wheel assembly is illustrated. In this variant, a plate 62 supports a pair of sidewalls 64, 66 and includes a central opening 68. To increase the friction between ground 70 and plate 62, a plurality of nubbins 72 may be disposed on the under side, as shown in FIG. 6. These nubbins may be in the form of spot welds or the like. A bracket 74 includes panels 76, 78 interconnected at the upper end with a cross member 80. A stud 82 extends from panel 76 through sidewall 66 to provide pivotal support for arm 92. Similarly, a stud 84 extends from panel 78 through sidewall 64 to provide support for arm 90. Cross member 80 may include a aperture 86 or the like, for securing a cup or cylinder 88 (as shown in FIG. 6) for receiving a jackstand of a trailer or other element to be supported.

A pair of arms 90, 92 are pivotally supported upon the studs 84, 82, respectively. Thereby, these arms are free to pivot about the axis of the lines studs 82, 84. A bolt 94 interconnects the free end of arms 90, 92. An axle 96 extends intermediate the other ends of pair of arms 90, 92 to rotatably support a wheel 98. As shown in FIG. 8, the wheel is generally coincident with opening 68 to permit pass through of the wheel. To permit the rotational movement of the pair of arms supporting wheel 98, a pair of arcuate apertures are disposed in each of sidewalls 64, 68 to accommodate arcuate movement of axle 98 there along.

To retain pair of arms 90, 92 in the upper position, as shown in FIG. 7, a spring 102 interconnects arm 90 with sidewall 64 and a further spring 104 interconnects arm 92 with sidewall 66. Thereby, the pair of arms are biased upwardly, as represented by arrow 106. A foot plate 110 is pivotally mounted on bolt 92 by a cylinder 112 to accommodate pivotal movement of the foot plate relative to bolt 94. A catch 114 extends downwardly from the cylinder and includes a lip 116.

In operation in the quiescent mode, variant 60 has wheel 98 extending downwardly through plate 62 in response to the force exerted by springs 102, 104, as depicted in FIG. 7. To raise the wheel and lower plate 62 to ground 70 (see FIG. 6) a force is exerted upon foot plate 110 to cause clockwise pivotal movement of pair of arms 102, 104. Such movement of the pair of arms will cause axle 96 to traverse through arcuate apertures 100 due to pivotal movement about studs 82, 84 until the wheel is fully retracted as depicted in FIG. 6. To retain the wheel fully retracted, foot plate 110 is pivoted counterclockwise to accommodate passage of lip 116 of catch 114 past edge 118 of plate 62. Subsequent clockwise movement of the foot plate will cause lip 116 to engage the under surface of the plate, as depicted in FIG. 6. This will result in a locking of wheel 98 to the retracted position. To release the wheel and permit downward travel, foot plate 110 is rotated in the counterclockwise direction to withdraw lip 116 from beneath plate 62. Thereafter, wheel 92 is extended downwardly in response to the force of springs 102, 104.

Referring to FIGS. 9, 10, 11 and 12, there is illustrated a further variant 120 of the retractable wheel assembly. A housing 122 is mounted upon a plate 124, which plate may include an upturned section 126. A cylinder 128, or the like, may be mounted at the upper end of housing 122 to receive a jackstand or other element to be supported by further variant 120 of the retractable wheel assembly. A bearing 130 may be incorporated intermediate cylinder 128 and housing 122 to permit rotational movement of the cylinder about a vertical axis represented by bolt 132. Alternatively, the cylinder or other device for receiving and retaining an element may be attached rigidly or removably to housing 122. Housing 122 includes an end wall 136 extending upwardly from plate 124 and a pair of sidewalls 138, 140 interconnecting with the end wall and the plate. Studs 142, 144 extend toward one another from respective sidewalls 138, 140. Arm 146 is pivotally mounted on stud 142 and arm 148 is pivotally mounted on stud 144. These arms may be referred to as a pair of arms. An axle 150 interconnects arms 146, 148 and rotatably supports wheel 152. As illustrated, the pair of arms are configured in the manner of a dog leg. The free ends of the pair of arms supports a footplate 154 pivotally mounted on a bolt 156 interconnecting the pair of arms. A catch extends downwardly from the underside of foot plate 154 and includes a lip 160. A further bolt or pin 162 interconnects the pair of arms, as illustrated.

In operation, extension of wheel 152 from the position illustrated in FIG. 9 is accomplished by exerting a downward force on foot plate 154. Such downward force will cause pair of arms 146, 148 to rotate in a clockwise direction about studs 142, 144. This will result in downward movement of wheel 152 to a position illustrated in FIG. 11. By rotating foot plate 154 about bolt 156 in a counterclockwise position, lip 160 of catch 158 will clear edge 164 of plate 124. Upon subsequent clockwise rotation of the foot plate, lip 160 will come into engagement with plate 174. To enhance the locking feature of the lip with the plate, the plate may be indented or apertured to receive upwardly extending edge 166 of lip 160.

To retract wheel 152, foot plate 154 is rotated about bolt 156 in a counterclockwise direction which will result in release of lip 160 from plate 124. Subsequent reduction in downward force on the foot plate will cause pair of arms 146, 148 to rotate counterclockwise due to the downward force exerted by housing 136 and the load placed thereon. Such retraction of the wheel will continue until plate 124 becomes supported upon the ground.

While the above discussion has focused use of the invention in conjunction with a trailer, many other uses exist. For example, the invention can be used to support each of a plurality of upright stanchions of scaffolding. By lowering the wheels of each engaged retractable wheel assembly, the scaffolding can easily be moved to a new location. Thereafter, the wheels can be raised to effectively anchor each of the stanchions on the ground at the new location. It is to be understood that the ultimate user may use the invention with any of a multiple of structures or devices whether normally stationary or mobile.

I claim:

1. A retractable wheel assembly, said assembly comprising in combination:
   a) a housing;
   b) a plate for supporting said housing;
   c) a pair of arms pivotally attached to said housing for rotatably supporting a wheel;
   d) a foot plate attached to said pair of arms for exerting a force on said pair of arms to extend said wheel to a location below said plate; and
   e) a catch for engaging said pair of arms with said plate to retain said wheel extended below said plate.

2. The assembly as set forth in claim 1 including means for engaging said housing with the tongue of a trailer.

3. The assembly as set forth in claim 1 including a cylinder for raising the end of an element to be raised and lowered by operation of said assembly.

4. The assembly as set forth in claim 1 including bias means for urging engagement of said catch with said plate.

5. The assembly as set forth in claim 1 wherein said foot plate is pivotally attached to said pair of arms to permit pivotal movement of said foot plate and release of said catch from said plate.

6. The assembly as set forth in claim 1 wherein said plate includes an opening for accommodating extension of said wheel from within said housing.

7. A method for anchoring and moving an element supported upon a retractable wheel assembly, said method comprising the steps of:
   a) engaging the element with a housing of the assembly;
   b) applying a force to a foot plate attached to a pair of arms pivotally engaged with the housing and supporting a wheel;
   c) urging downward movement of the wheel in response to exercise of said step of applying;
   d) locking the pair of arms with the hosing to retain the wheel extended, whereby the extended wheel will accommodate movement of the element;
   e) releasing the pair of arms to accommodate retraction of the wheel to locate the housing on the ground, whereby the engagement of the housing upon the ground will immobilize the element; and
   f) locating a plate supporting the housing on the ground upon exercise of said step of releasing.

8. The method set forth in claim 7 including the step of pivoting the foot plate to carry out said step of releasing.

9. The method set forth in claim 7 including the step of attaching the element to the housing to prevent inadvertent disengagement therebetween.

10. A retractable wheel assembly for selective attachment to an unit to permit movement of the unit across the ground or to immobilize the unit at a location on the ground, said assembly comprising in combination:
    a) a housing detachably attachable at the upper end to the unit;
    b) a support plate disposed at the lower end of said housing;
    c) a pair of arms pivotally attached to said housing and extending therefrom for rotatably supporting a wheel;
    d) a foot plate in engagement with said pair of arms for exerting a downward force upon said arms to lower said pair of arms and said wheel below said support plate;
    e) a catch for securing said pair of arms in their lowered position to retain said wheel in its lowered position; and
    f) a release mechanism for releasing said catch to permit upward pivotal movement of said pair of arms to raise said wheel above said support plate.

11. The assembly as set forth in claim 10 including an opening in said support plate for accommodating partial extension of said wheel therethrough.

12. The assembly as set forth in claim 11 wherein said housing includes side walls for extending partially across said wheel.

13. The assembly as set forth in claim 10 including a shaft extending intermediate said pair of arms for rotatably supporting said wheel.

14. The assembly as set forth in claim 10 wherein said foot plate is pivotally attached to said pair of arms and serves as said release mechanism.

15. The assembly as set forth in claim 14 wherein said catch extends from said foot plate for engagement with said support plate.

16. A retractable wheel assembly comprising in combination:
    a) a housing;
    b) a plate for supporting said housing;
    c) a pair of arms pivotally attached to said housing for rotatably supporting a wheel;
    d) at least one spring disposed intermediate said pair of arms and said housing for urging pivotal movement of said pair of arms to at least partially extend said wheel to below said plate;
    e) a foot plate pivotally secured to said pair of arms for urging pivotal movement of said pair of wheels to retract said wheel to a location above said plate; and
    f) a catch for retaining said pair of arms at a location which retains said wheel above said plate.

17. The assembly as set forth in claim 16 wherein said at least one spring includes a spring interconnecting one arm of said pair of arms with said housing and another spring interconnecting another arm of said pair of arms with said housing.

18. The assembly as set forth in claim 16 including a receiver mounted on said housing for engagement with a jackstand of a trailer.

19. The assembly as set forth in claim 16 wherein said catch is responsive to pivotal movement of said foot plate.

* * * * *